United States Patent
Barenboim et al.

[11] Patent Number: 5,830,514
[45] Date of Patent: Nov. 3, 1998

[54] CONTROLLING PULSES IN A LASER TEXTURING TOOL

[75] Inventors: Michael Barenboim, Boca Raton, Fla.; Peter Michael Baumgart, San Jose, Calif.; Peter P. Chrusch, Boynton Beach, Fla.; Benjamin Karni, San Jose, Calif.; Pieter J. M. Kerstens; Hong S. Seing, both of Boca Raton, Fla.; Andrew Ching Tam, Saratoga, Fla.

[73] Assignee: International Business Machines Corporation, Armonk, N.Y.

[21] Appl. No.: 707,385

[22] Filed: Sep. 4, 1996

[51] Int. Cl.⁶ .................................................. G11B 5/84
[52] U.S. Cl. ................................ 425/174.4; 219/121.61; 219/121.68; 264/400; 264/482; 425/385
[58] Field of Search ................................ 425/174.4, 385, 425/810; 264/1.27, 1.33, 400, 482; 219/121.61, 121.73, 121.62, 121.68, 121.82

[56] References Cited

U.S. PATENT DOCUMENTS

| | | | |
|---|---|---|---|
| 4,494,236 | 1/1985 | Sutter, Jr. | 372/25 |
| 4,675,872 | 6/1987 | Popek et al. | 372/10 |
| 5,062,021 | 10/1991 | Ranjan et al. | 360/135 |
| 5,108,781 | 4/1992 | Ranjan et al. | 427/53.1 |
| 5,528,922 | 6/1996 | Baumgart et al. | 73/1.79 |
| 5,586,040 | 12/1996 | Baumgart et al. | 364/474.08 |
| 5,595,768 | 1/1997 | Treves et al. | 425/174.4 |
| 5,595,791 | 1/1997 | Baumgart et al. | 427/554 |
| 5,658,475 | 8/1997 | Barenboim et al. | 219/121.77 |

OTHER PUBLICATIONS

*Instruction Manual for Model 7300 Laser Systems*, Spectra Physics, Mountain View, CA, 1990.

*Primary Examiner*—James P. Mackey
*Attorney, Agent, or Firm*—Richard A. Tomlin; Ronald V. Davidge

[57] ABSTRACT

A disk texturing tool is used, for example, to provide textured spots in an annular portion of both sides of a hardfile disk. Disks are moved into and out of the texturing process in cassettes, through two disk-handling stations. Texturing occurs as the annular portions are exposed to a train of pulses from a Q-switched laser. The Q-switch within the laser is driven by a radio-frequency signal form an oscillator, which is in turn driven by a signal from a pulse generator, which can be adjusted to leave the radio-frequency signal on for a variable time between pulses without changing pulse frequency. The laser may be equipped with a shutter and with an electronic gate selectively preventing the production of laser pulses.

16 Claims, 5 Drawing Sheets

FIG. 1.

PRIOR ART

FIG. 2.

PRIOR ART

CONTROLLING PULSES IN A LASER TEXTURING TOOL

CROSS-REFERENCE TO A RELATED APPLICATION

A U.S. application Ser. No. 08/150,525, filed Nov. 10, 1993, now abandoned, entitled "Procedure Employing a Diode-Pumped Laser for Controllably Texturing a Disk Surface," by Peter M. Baumgart, et al., having a common assignee with the present invention, the disclosure of which is hereby incorporated by reference, describes a process for creating a "distant bump array" surface texture in a magnetic recording disk for reducing stiction, together with the disk so textured. The texturing process uses a tightly focused diode-pumped Nd:YLF or Nd:YVO$_4$ or other solid-state laser that is pulsed with a 0.3–90 nanosecond pulse train to produce a plurality of distantly-spaced bumps in the disk surface. The bump creation process is highly controllable, permitting repeated creation of a preselected bump profile, such as a smooth dimple or one with a central protrusion useful for low stiction without close spacing or elevated "roughness." Some bump profiles permit texturing of the data-storage region of the disk surface for low stiction without materially affecting magnetic data storage density.

Another U.S. application which has issued as U.S. Pat. No. 5,658,475, filed Mar. 11, 1996, entitled "Apparatus for Laser Texturing Disks," by Michael Barenboim, et al, having a common assignee with the present invention, further describes a laser texturing station in which the pulse control of the present invention may be used.

Another U.S. application filed Sep. 4, 1996, Ser. No. 08/707,383, now abandoned, entitled "Optical Apparatus for Dual-Beam Laser Texturing, having a common assignee with the present invention, describes optical apparatus for splitting and controlling a texturing laser beam used with the pulse control of the present invention;

Another U.S. application filed Sep. 4, 1996, Ser. No. 08/707,385, now abandoned, entitled "Apparatus and Method for Controlling a Laser Texturing Tool," and having a common assignee with the present invention, describes both electronic hardware and software used to control a laser texturing station in which the pulse control of the present invention may be used.

Another U.S. application filed Sep. 5, 1996, Ser. No. 08/708,627, now abandoned, entitled "Method for Controlling Laser Power in a Texturing Process," and having a common assignee with the present invention, describes a program for setting and maintaining the laser power levels in the optical apparatus of the present invention.

BACKGROUND OF THE INVENTION

Field of the Invention

This invention relates to apparatus for fabricating a disk, such as a magnetic recording disk used in a computer hardfile, having a surface textured by exposure to a pulsed laser, and, more particularly, to apparatus and means for controlling a laser in such an application.

Background Information

Current hardfile drives use a Contact Start-Stop (CSS) system allowing a magnetic head, used to read and write data, to contact the surface of a magnetic disk in a specific CSS region when the disk is stationary. Thus, before the rotation of a spinning disk has stopped, the magnetic head is moved to the CSS region, where the magnetic head settles on the surface of the disk. When the disk again starts to rotate, the magnetic head slides along the disk surface in this region, until the laminar air flow at the disk surface, due to its rotation, fully lifts the magnetic head from the disk surface.

After the magnetic head is lifted in this way, it is moved from the CSS region to another region of the disk to read and write data. The CSS region is preferably textured to minimize physical contact between the magnetic head and the disk surface. In this way, the contact stick-slip phenomenon often called "stiction" and other frictional effects are minimized, along with the resulting wear of the magnetic head surface. Outside the CSS region the remainder of the disk surface preferably retains a specular smoothness to permit high-density magnetic data recording.

To produce specific desirable features in the individual textured spots produced by an intermittent texturing process using a pulsed laser, it is often desirable to vary the shape (amplitude and width) of pulses from the laser. A conventional method for varying this pulse shape is to vary the repetition rate, or frequency, at which an input signal to the laser is switched. However, this method has the general disadvantage of varying the distance between textured spots on the medium being textured, as the physical characteristics of individual spots are changed. While a correction in this distance between spots can sometimes be made by adjusting the speed of the texturing process, such an adjustment is made particularly complex, and often impractical, by interactions between the rate at which texturing occurs and various processes associated with handling the media. Thus, what is needed is a method for varying the shape of laser pulses without changing the time elapsing between repetitions of such pulses.

During a laser texturing process, if the exposure of the disk being textured to the laser beam is terminated by closing a mechanical shutter, a number of partially exposed (and hence partially textured) spots are produced on the disk as the shutter is closing. A similar effect occurs if the exposure of the disk is begun by opening a mechanical shutter with the laser operating. In the application of texturing a magnetic disk to provide a CSS region, it is particularly desirable to form fully textured spots up to the outer edge of this region. Therefore, what is needed is a method to start and/or stop the process of exposure between sequentially adjacent pulses.

Description of the Prior Art

U.S. Pat. No. 5,062,021, to Ranjan et al., describes a process in which magnetic recording media are controllably textured, particularly over areas designated for contact with data transducing heads. In conjunction with rigid disk media, the process includes polishing an aluminum nickel-phosphorous substrate to a specular finish, then rotating the disk while directing pulsed laser energy over a limited portion of the radius, thus forming an annular head contact band while leaving the remainder of the surface specular. The band is formed of multiple individual laser spots, each with a center depression surrounded by a substantially circular raised rim. The depth of the depressions and the height of the rims are controlled primarily by laser power and firing pulse duration. The shape of individual laser spots can be altered by varying the laser beam inclination relative to the disk surface. On a larger scale, the frequency of firing the laser, in combination with disk rotational speed controls the pattern or arrangement of laser spots. The smooth, rounded contours of the depressions and surrounding rims, as compared to the acicular character of mechanical textured surfaces, is a primary factor contributing to substantially increased durability of laser textured media.

SUMMARY OF THE INVENTION

In accordance with one aspect of the invention, there is provided apparatus for texturing an annular region on a disk. The apparatus includes a Q-switched laser. a spindle drive rotating the disk, a translational drive, an oscillator, and a pulse generator. The Q-switched laser produces a beam directed at the disk. The translation drive causes relative movement between a target of the laser and the disk, in a radial direction along the disk. (In this context, the target of the laser is the point at which the laser is aimed, regardless of whether the laser beam is turned on). The oscillator drives a Q-switch within the laser with a radio-frequency signal. The pulse generator causes pulsed operation of the laser, in which each a time diration of each pulse within a train of pulses from the pulse generator may be varied without simultaneous variation of the frequency of the pulses within the train of pulses.

In accordance with another aspect of the present invention, there is also provided a motion sensing mechanism operating in response to the relative movement caused by the translational drive. The motion sensing means provides a first signal indicating that the target of the laser is within the annular region to be textured, with the relative motion occurring in a pre-determined direction. A shutter opens at a beginning of the first signal and closes at an end of the first signal.

In accordance with yet another aspect of the present invention, there is also provided a gate circuit switching between a closed mode preventing a flow of pulses from the pulse generator to the oscillator and an open mode allowing the flow of pulses, wherein the gate circuit switches to the closed mode when the shutter is closed.

DETAILED DESCRIPTION

The following describes a textured disk and laser texturing apparatus in which the laser control means of the present invention are applied.

Figures 1, 2, 3, 4:
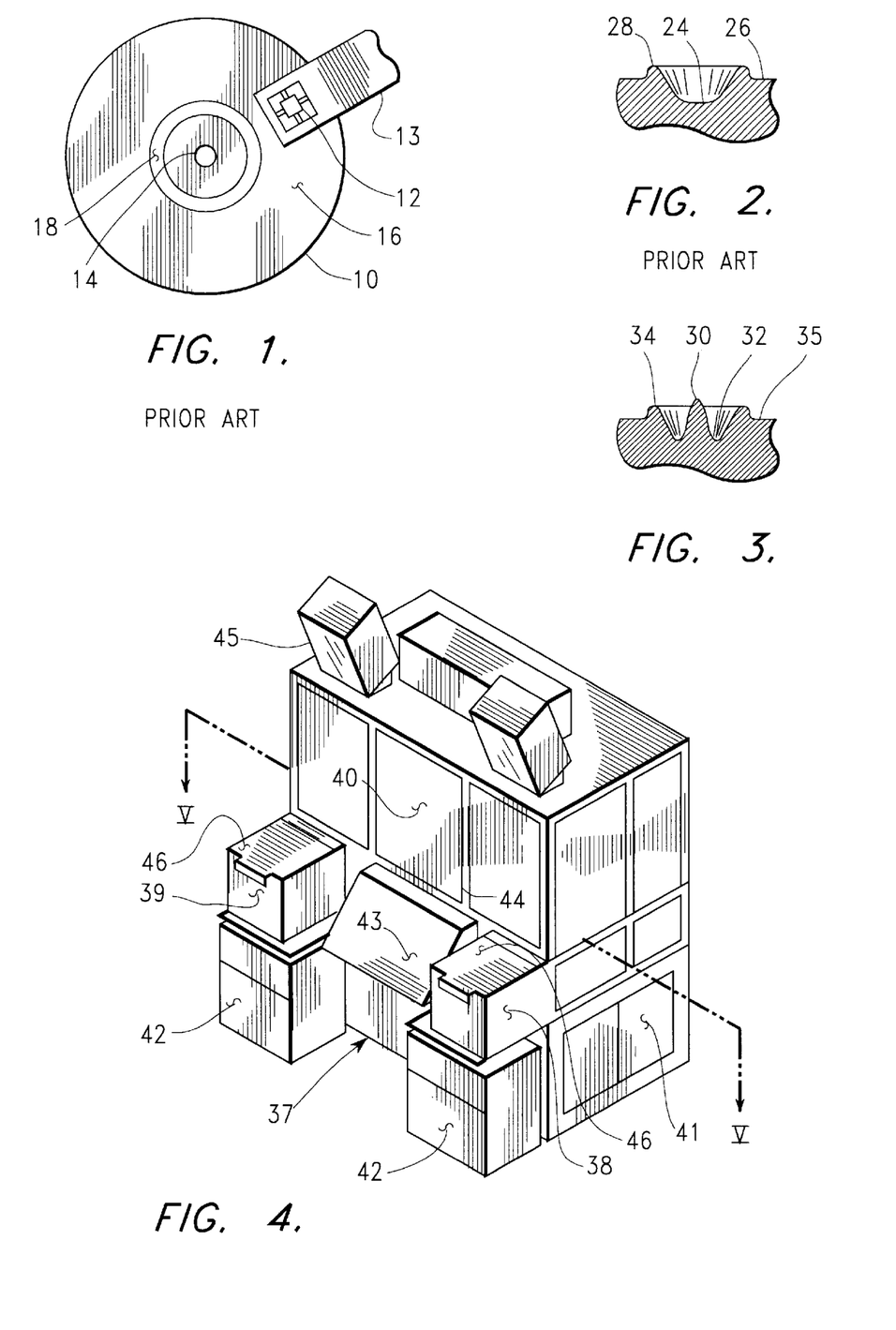
FIG. 1 is a plan view of an internal portion of a prior-art disk drive unit, including a rotatable magnetic disk having a textured annular region for CSS operation, and a magnetic head.
FIGS. 2 and 3 are transverse cross-sectional views of individual textured spots, which form examples of spots which may be made using the apparatus of the present invention, with the spot of FIG. 2, being formed particularly according to the method of U.S. Pat. No. 5,108,781, and with the spot of FIG. 3 being formed particularly according to the method of co-pending U.S. application Ser. No. 08/150,525.
FIG. 4 is an isometric view of a laser disk texturing tool.

FIG. 1 is a plan view of a portion of a disk drive unit from the prior art for a computing system, including a rotatable magnetic storage disk 10, together with a magnetic head 12, which is driven in a generally radial direction relative to the disk 10 by means of a drive arm 13. This disk 10 is an example of the type of product which can be made using the apparatus of the present invention. When the disk drive unit is in operation, disk 10 is rotated about its central hole 14, forming a laminar flow of air holding magnetic head 12 slightly away from the adjacent disk surface 16. Before this rotation is stopped, magnetic head 12 is driven to be adjacent to a textured annular region 18 of the surface of disk 10. As this disk rotation slows and stops, the frictional and stiction effects occurring between the surface of annular region 18 and the adjacent contacting surface of magnetic head 12 are minimized by the textured nature of the surface of this region 18. Subsequently, when the rotation of disk 10 is restarted, these effects are again minimized, as the rate of rotation of disk 10 increases until the laminar flow of air near its surface lifts the adjacent surface of magnetic head 12 completely away from the disk surface. Thus, as the rotation of disk 10 is stopped and subsequently restarted, the wear of the surface of magnetic head 12 is minimized. Disk 10 is preferably a double-sided magnetic storage disk, with a second side, opposite the side shown in FIG. 1, having similar features.

FIGS. 2 and 3 are transverse cross-sectional views of individual textured spots, which form examples of spots which may be made using the apparatus and method of the present invention.

FIG. 2 shows a portion of a disk surface roughened by the prior-art method taught by Ranjan, et al., in U.S. Pat. No. 5,062,021. With this method, a portion of the disk surface to be roughened is exposed to a pulse of laser light. The surface is heated rapidly, so that a part of the surface material is melted and then rapidly cooled, changing the surface topography to include a generally round central depression 24 below the nominal surface plane 26 and a generally round peripheral ridge 28 above this plane 26. The process described by Ranjan, et al. produces a ring of textured spots of this kind by repeatedly firing a laser as the disk being textured is rotated. The laser is then displaced radially through a pitch distance, and a second ring of textured spots, concentric with the first ring thereof, is produced. This process is repeated until texturing fills the annular region to be textured. The nature of each individual textured spot is determined primarily by the peak energy at which the laser is fired. together with the pulse width. The distance between textured spots on the ring is determined by the relationship between the rate at which the laser is fired and the rotational speed at which the disk is turned.

FIG. 3 is a transverse cross-sectional profile of a laser textured spot produced using the method of the previously-described co-pending U.S. Pat. application Ser. No. 08/150, 525. The heights of surface features, compared to their widths, are exaggerated. A central protrusion 30 rises above the depth of the ring depression 32, preferably to a height somewhat greater than the height of the surrounding peripheral ring 34. The heights of the protrusion 30 and ring 34 above the nominally level surface 35 before texturing are determined by various laser and disk-material parameters, such as laser fluence, pulse width, spot size, and disk surface composition.

FIG. 4 is an isometric view of a laser-texturing tool 37, built in accordance with the present invention, which is used to apply laser-texturing to disks in a non-stop production mode as long as cassettes filled with disks are loaded and unloaded at a sufficient rate. These cassettes move through a right disk-handling station 38 and a left disk-handling station 39, with individual disks from these stations 38 and 39 being alternately textured by a single laser assembly in a laser-texturing station 40. A modular configuration allows the tool 37 to continue running, at a reduced rate of production, even if one of the disk-handling stations 38, 39 cannot be used.

The laser-texturing tool 37 is a self-contained system, with necessary electrical, electronic, and pneumatic components located in a base section 41 and in a pair of instrumentation cabinets 42. Various controls and output devices are placed on a slanted control panel 43. Since the infrared laser used in the texturing process produces invisible, potentially-harmful rays, a laser-texturing station 40 is housed in a light-tight cabinet within the tool 37, with a safety switch operated by the opening of each access door 44 turning off the laser. Furthermore, these doors 44 can be opened only when the tool is in a maintenance mode. The tool 37 is switched between automatic and maintenance modes by turning a mode switch (not shown) on control panel 43. Two television cameras (not shown), mounted within the laser-texturing station, allow the process to be viewed on a pair of monitors 45.

The upward-opening doors 46 of disk-handling stations 38 and 39, providing access for loading and unloading cassettes holding disks, are not interlocked, and may be opened or closed at any time, even during the operation of the texturing process. Within the tool 37, rays from the laser are blocked from the areas in which these cassettes are loaded and unloaded.

Figure 5:
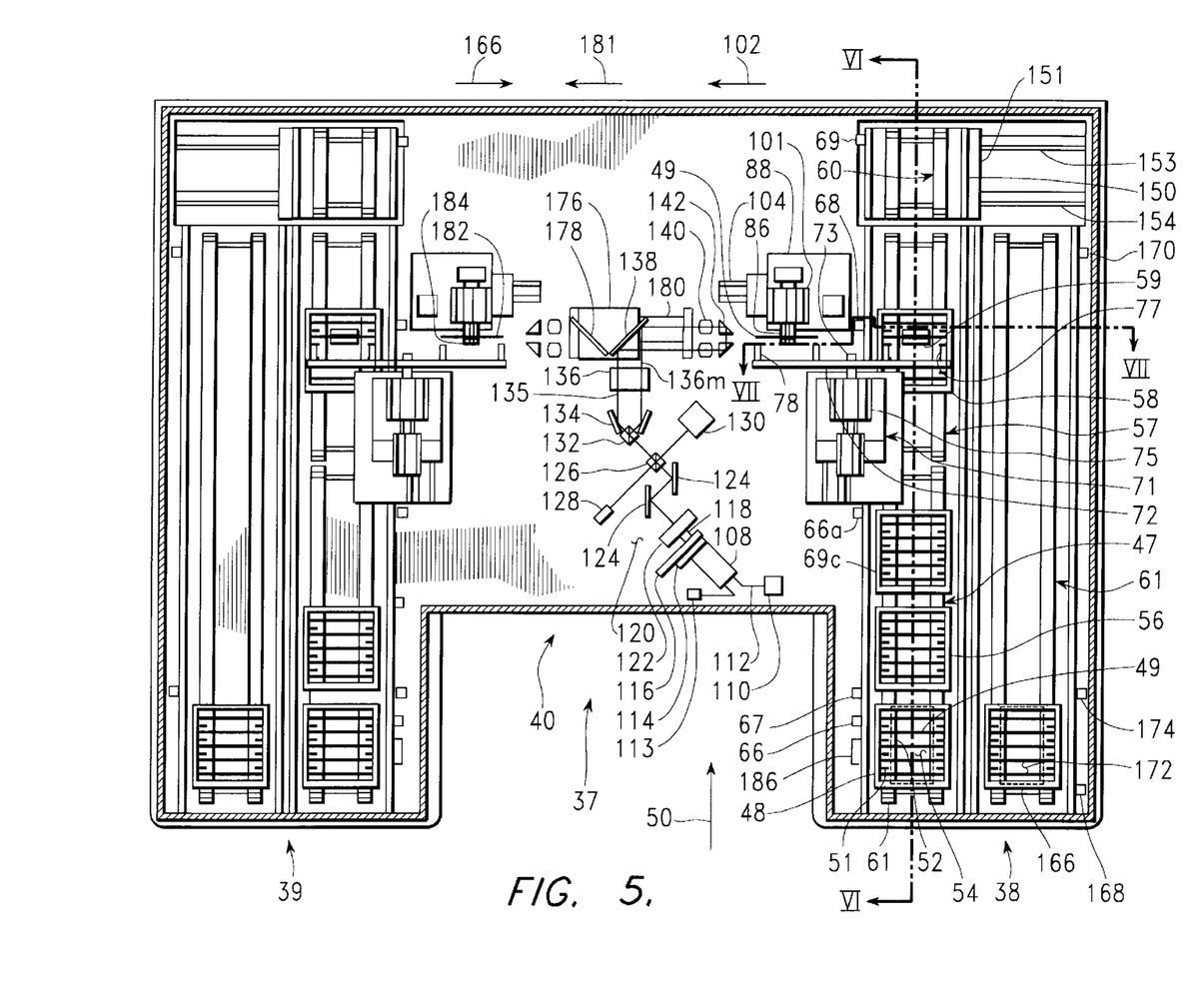
FIG. 5 is a cross-sectional plan view of the tool of FIG. 4, taken as indicated by section lines V—V in FIG. 4 to show disk-handling and laser-texturing stations thereof.

FIG. 5 is a horizontal cross-sectional view of laser-texturing tool 37, taken as indicated by section lines V—V in FIG. 4, to reveal particularly disk-handling stations 38, 39 and the laser-texturing station 40. Left disk-handling station 39 is a mirror image of right disk-handling station 38. Each disk-handling station 38, 39 has an input conveyor 47 carrying cassettes 48 loaded with disks 49 to be textured, rearward, in the direction of arrow 50. Each cassette 48 has a number of pockets 51 in which disks 49 are loaded in a vertical orientation, and a lower opening 52 allowing the removal of individual disks by lifting from below. While FIG. 5 shows cassettes having only five disks, for clarity, in reality a cassette for this system typically holds 25 disks.

Figure 6:
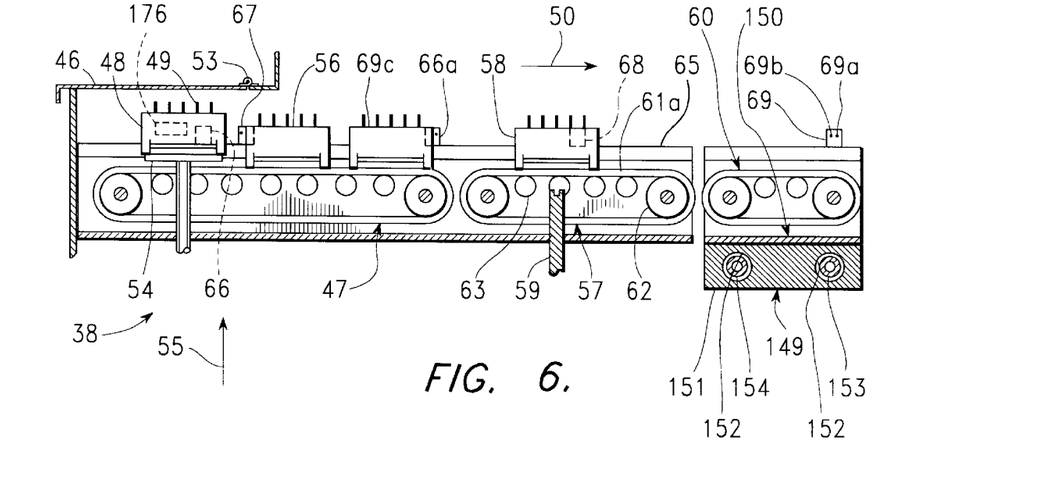
FIG. 6 is a cross-sectional side elevational view of the tool of FIG. 4, taken as indicated by section lines VI—VI in FIG. 5 to show mechanisms used to handle cassettes holding disks for texturing.

FIG. 6 is a cross-sectional side elevational view of the tool of FIG. 4, taken as indicated by cross-section lines VI—VI in FIG. 5, to show the conveyor systems moving cassettes filled with disks into and through the process. The tool operator loads a cassette 48 filled with disks 49 to be textured by opening the access door 46, which pivots upward along its rear hinge 53. The cassette 48 is normally loaded onto a raised platform 54, which, in this position holds the cassette 48 upward, in the direction of arrow 55, away from input conveyor 47, allowing this conveyor 47 to move another cassette 56 stored in a queue on the conveyor 47 without simultaneously moving the most-recently loaded cassette 48. FIG. 6 also shows a cassette indexing conveyor 57, which moves a cassette 58 in incremental motions above a disk lifter 59, so that the disk lifter 59 can remove individual disks 49 from the cassette 58 for placement into the laser-texturing process, and so that the disk lifter 59 can subsequently return textured disks to the cassette 58. FIG. 6 also shows a transfer table conveyor 60, which is used in the movement of cassettes filled with textured disks from indexing conveyor 57 to an output conveyor 61 (shown in FIG. 5).

Figure 7:
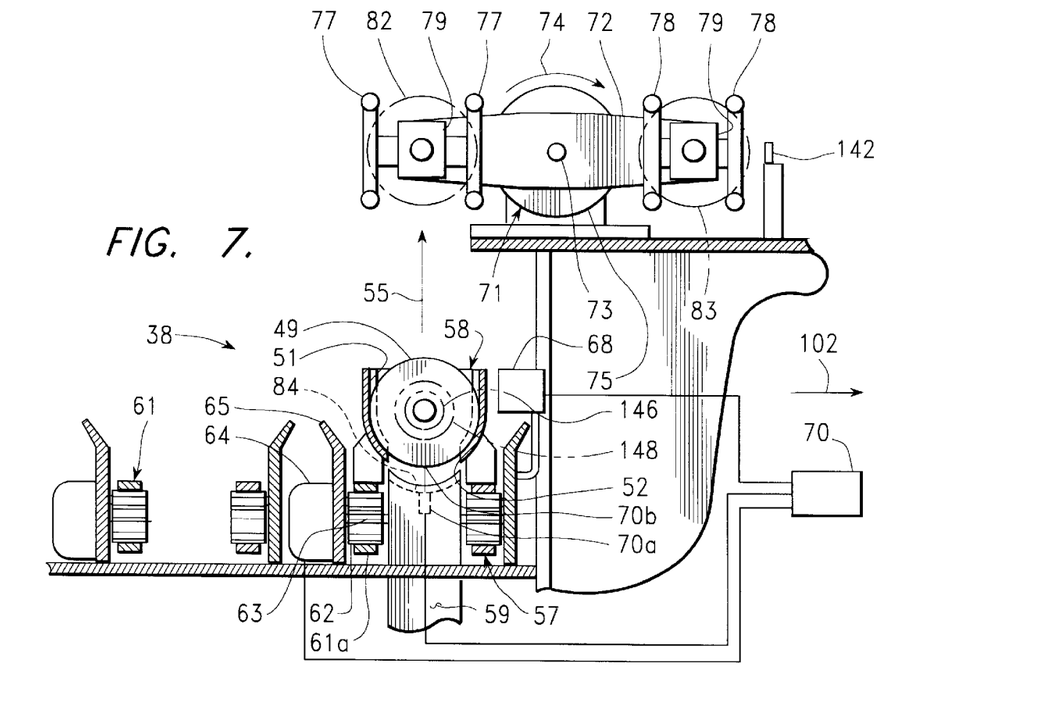
FIG. 7 is a cross-sectional rear elevational view of the tool of FIG. 4, taken as indicated by section lines VII—VII in FIG. 5 to show the mechanism used to transfer disks from cassettes within the disk-handling stations to the laser-texturing station and to return the disks to the cassettes.

FIG. 7 is a cross-sectional rear elevational view of the tool of FIG. 4, taken as indicated by section lines VII—VII in FIG. 5, to show the mechanism used to transfer disks from a cassette 58 within the disk-handling station 38 into the laser texturing process and to return textured disks to the cassettes. FIG. 7 also provides a transverse cross-sectional views of cassette indexing conveyor 57 and of output conveyor 61.

The movement of a cassette to the point at which individual disks are removed from the cassette to be carried into the texturing process will now be discussed, with particular reference being made to FIGS. 6 and 7.

Thus, referring to FIGS. 5, 6, and 7, each conveyor 47, 57, 60, 61 includes a belt 61a extending under each side of a cassette 48, 56, 58 loaded thereon. Each belt 61a extends between a pair of end rollers 62 and above a number of idler rollers 63. At one end of each conveyor 47, 57, 60, 61 the end rollers 62 are driven in either direction by a motor 64. This system for cassette transport also includes a pair of lateral guides 65, ensuring that each cassette stays in place atop the conveyors, and cassette detectors 66, 66a, 67, 68, 69, which determine when a cassette reaches an adjacent point along a conveyor system. Each cassette detector 66, 66a, 67, 68, 69 includes a light source 69a which is reflected off an adjacent surface of a cassette when such a surface is present, to be detected by a receiver 69b, which in turn provides an input to a computing system 70 controlling the operation of the motors 64 and other motors, solenoids, and valves within the laser-texturing tool 37 to effect operation as described herein.

When cassette 48 is placed on top of raised platform 54, its presence is detected by first input cassette detector 66. Since the input conveyor 47 and the system logic controlling its movement are configured to allow the queuing of cassettes, the subsequent movement of the cassette 48 is determined by whether other cassettes are already present on input conveyor 47 and indexing conveyor 57. If no cassette is already present on these conveyors 47, 57 (i.e., if cassettes 56, 58, and 69c are not present), platform 54 is lowered, so that the cassette 48 rests on top of input conveyor 47, and the conveyors 47, 57 are turned on to move cassette 48 rearward, in the direction of arrow 50. When indexing cassette detector 68 detects the presence of a cassette being moved in this way, input conveyor 47 and indexing conveyor 57 are stopped, leaving the cassette positioned so that the first of its pockets 51 in which diskettes 49 may be placed (i.e. the end pocket farthest in the direction indicated by arrow 50) is directly over disk lifter 59.

On the other hand, if a cassette 58 is present on indexing conveyor 57, and if no other cassette 56, 69c is present on input conveyor 47, when cassette 48 is placed on raised platform 54, this platform 54 is lowered, and conveyor 47 is turned on to move cassette 48 in the direction of arrow 50. This movement is stopped when the presence of the cassette 48 is detected by second input cassette detector 66a, leaving the cassette queued on the input conveyor 47, in the position in which cassette 69c is shown.

If a cassette 58 is present on indexing conveyor 57, and if a single cassette 69c is present on input conveyor 47, when cassette 48 is placed on raised platform 54, this platform 54 remains raised while input conveyor 47 is turned on to move cassette 69c opposite the direction of arrow 50 until this cassette 69c is sensed by third cassette sensor 67. Then, platform 54 is lowered, and input conveyor 47 is turned on to move both cassettes 48, 69c in the direction of arrow 50. This movement is stopped when cassette 69c is detected by second cassette sensor 66a, leaving both cassettes 48, 69c queued on input conveyor 47.

Finally, if all three cassettes 56, 69c, and 58 are present on conveyors 47, 57 when cassette 48 is placed on raised platform 54, the movement of cassettes does not directly ensue, leaving cassettes 56, 69c queued on input conveyor 47 and cassette 48 queued on raised platform 54.

When the texturing process has been completed on all of the disks 49 to be textured within the cassette 58 on indexing conveyor 57, this conveyor 57 and transfer table conveyor 60 are turned on to move the cassette 58 rearward, in the direction of arrow 50, completely onto the transfer table conveyor 60. This motion is stopped when the presence of cassette 58 is detected by transfer table cassette detector 69. If cassette 56 is present on input conveyor 47, as determined by second input cassette detector 67, when cassette 58 is transferred from indexing conveyor 57 in this way, this queued cassette 56 is moved by conveyors 47, 57 to the point at which its presence is detected by indexing cassette detector 68. If a second queued cassette 48 is present on raised platform 54 when a first queued cassette 56 is moved from input conveyor 47 to indexing conveyor 57, platform 54 is lowered, and the first queued cassette 48 is driven by input conveyor 47 until the presence of the cassette 48 is detected by second input cassette detector 67.

The movement of an individual disk from a cassette into the texturing process will now be discussed, with particular reference being made to FIGS. 5 and 7.

Thus, referring to FIGS. 5 and 7, to allow the movement of individual disks 49 through the laser-texturing process, indexing conveyor 57 moves cassette 58 in a number of rearward and forward motions, in and opposite the direction of arrow 50, sequentially aligning the individual disk pockets 51 of the cassette 58 with a disk lifter 59. Disk lifter 59 includes a proximity sensing mechanism 70a, for determining whether a disk 49 is present in each pocket 51. This sensing mechanism 70a consists of an internal light source aimed at an adjacent edge 70b of a disk present in a pocket 51 and an internal sensor detecting light reflected from such an edge 70b. The output of sensing mechanism 70a provides an additional input to computing system 70. Thus, cassette 58 is moved to the rear, in the direction of arrow 50, by indexing conveyor 57, until proximity sensing mechanism 70a indicates the presence of a disk 49 in a particular pocket 51, passing any empty pockets 51 within the cassette 58. When a disk is detected by proximity sensing mechanism 70a, the rearward movement of cassette 58 is stopped, and the disk lifter 59 moves upward, in the direction of arrow 55, carrying the disk 49 which is aligned the lifter 59 upward for transfer to a pick-and-place mechanism 71.

Pick-and-place mechanism 71 has an arm 72 rotatable about the axis of a drive shaft 73, in and opposite the direction of arrow 74, in 180-degree increments. This rotation is effected by the incremental operation of arm drive motor 75. At each end of arm 72, a pair of grippers 77, 78 is movable between an open position, in which grippers 77 are shown, and a closed position, in which grippers 78 are shown, by means of a pneumatic actuator 79. When a pair of grippers 77, 78 is in the closed position, a disk placed between the grippers is held by four points around its periphery. When the pair of grippers is opened, a disk held in this way is released. The pick and place mechanism 71 is also moved rearward, in the direction of arrow 50, into a position in which disks are picked up and released, and forward, in the direction opposite arrow 50, into a position in which arm 72 is rotated.

The upward movement of disk lifter 59 carries a disk 49, which is to be textured next, upward into the location indicated by phantom line 82. This motion, which brings the disk 49 into vertical alignment with the open grippers 77 of arm 72, occurs with pick and place mechanism 71 in its forward position (i.e., moved opposite the direction of arrow 50), allowing the upward passage of disk 49 past grippers 77. At this point, the disk rests within a groove 84 of the lifter 59. Next, pick and place mechanism 71 moves in the direction of arrow 50 to its rearward position, aligning the open grippers 77 with the edge of disk 49. Then, grippers 77 are closed, grasping the disk 49. Disk lifter 59 next descends to disengage from the periphery of disk 49. Next, pick and place mechanism 71 moves opposite the direction of arrow 50 to its forward position, and the arm 72 rotates 180 degrees in the direction of arrow 74, placing disk 49 in the position indicated by phantom line 83, in axial alignment with a spindle 86 of a spindle assembly 88. Then, pick-and-place mechanism 71 returns in the direction of arrow 50 to its rearward position, placing the disk 49 on the end of spindle 86.

Referring to FIGS. 5 and 7, pick-and-place mechanism 71 next moves to the rear, in the direction of arrow 50, placing the disk 49 to be textured, which is now at the position indicated by phantom line 83 in FIG. 7, on the end of spindle 86, which clamps the disk on the spindle, clamping the disk 49 in place, and the grippers, which have been holding the disk on arm 72, open, releasing the disk 49. After disk 49 is placed on spindle 86, the pick-and-place mechanism 71 moves forward, opposite the direction of arrow 50, and the spindle drive motor 101 of spindle assembly 88 begins to rotate spindle 86 to bring the disk 49 up to a rotational velocity at which exposure to laser pulses will occur. The spindle assembly 88 also begins to move inward, in the direction of arrow 102, being driven by a spindle translation motor 104, carrying the disk 49 into the texturing process.

The laser-texturing station 40 will now be discussed, with specific references being made to FIG. 5.

Thus, referring to FIG. 5, within the laser-texturing station 40, a beam from an infrared pulsed laser 108 is used to produce the desired surface texturing on the disk 49. As described in the co-pending application referenced above, the laser 108 may be, for example, a Nd:YLF solid state laser, providing an output at a wavelength of 1.047 microns, or Nd:YVO$_4$ solid state laser, operated with a diode pumping signal, driven from a laser diode 110 through a fiber-optic cable 112, and pulsed by a Q-switch control 113. A beam from the laser 108 is directed through an electronic process shutter 114 and a mechanical safety shutter 116. In a first embodiment of the present invention, when the laser-texturing station 40 is operating, a train of laser pulses is emitted from the laser 108, with the actual texturing process being started and stopped by opening and closing the electronic process shutter 114. The safety shutter 116 remains open during the entire texturing process, unless an error condition, such as a jam of a disk or cassette, occurs. The detection of such an error condition causes the safety shutter 116 to close, by means of the software running the laser-texturing tool 37. The laser 108, electronic process shutter 114, and safety shutter 116 together form a light-tight assembly, from which even a portion of the laser beam cannot escape when either shutter 114,116 is closed.

After passing through the shutters 114, 116, the laser beam enters a polarizing beamsplitter 118, which is oriented so that the portion of the laser beam, if any, having an unwanted p-polarization is directed downwards toward an underlying plate 120, leaving the portion of the laser beam having a vertical s-polarization to propagate through the remaining optical path. Next, the laser beam passes through a 3X beam expander/collimator 122, which permits the adjustment of the infrared laser spot size at a lens entrance. From expander collimator 122, the laser beam is directed by a pair of dielectric-coated steering mirrors 124 to a dichroic beamsplitter 126. A visible laser beam, for example from a 2-mW laser diode 128, is also directed toward the beamsplitter 126, permitting alignment of the optical system by tracing the red laser dot. The infrared beam from laser 108 is made to be coincident with the red beam from laser diode 128 by manipulating the two steering mirrors 124. About three percent of the laser beam entering beamsplitter 126 from the infrared laser 108 is reflected from the beamsplitter 126 to a power detector 130, which provides in-situ monitoring of the laser power.

The infrared laser beam leaving the dichroic beamsplitter 126 is directed to a non-polarizing beamsplitter cube 132, which splits the beam into two beams that are equal in intensity within five percent. These two beams are directed, by means of a pair of steering mirrors 134, toward opposite sides of the disk being carried through the texturing process by spindle assembly 88. After reflection off these steering mirrors 134, the laser beams travel as a pair of parallel beams, separated by a distance of 25 mm, to enter a power control optics block 136, in which the intensity of the two beams is balanced by controlling the voltage applied to liquid-crystal variable retarders. In this way the intensity of the parallel laser beams leaving the power control optics block 136 is made equal within one percent.

In the example of FIG. 5, the parallel laser beams from power control optics block 136 are reflected off a right shuttling mirror 138, being directed toward a disk carried through the texturing process from the right disk-handling station 38. Each of these beams passes through a focussing achromatic triplet lens 140, having a focal length of 25.4 mm, and is reflected toward the surface of the disk being textured by a right-angle prism 142. Each lens 140 is mounted on a finely adjustable stage, permitting the adjustments needed to center the beam and to achieve optimum focus on each side of the disk. Each prism 142 is slightly tilted, so that a laser beam reflected off the surface of the disk being textured is not transmitted back through the optical path.

The movement of a disk through the laser-texturing process, and its subsequent return to the cassette from which it has been taken, will now be discussed, with particular reference being made to FIGS. 5 and 7.

Thus, referring to FIGS. 5 and 7, the disk 49 clamped to spindle 86 is first brought up to the rotational speed desired for the texturing process, as the motion of spindle assembly 88 drives the disk 49 inward, in the direction of arrow 102, to or past the point at which the inner diameter, indicated on FIG. 7 by phantom line 146, of the surfaces to be textured is adjacent to the point at which exposure will occur to laser beams reflected from prisms 142. The actual exposure, which is started by opening electronic process shutter 114, occurs as the disk 49 is rotated, for example, at a constant speed, by spindle drive motor 101 and as the disk 49 is moved in the outward direction, opposite arrow 102, for example, at a constant speed, by the spindle translation motor 104. When the disk 49 passes the point at which the outer diameter, indicated by phantom line 148, of the surfaces to be textured is adjacent to the point at which exposure occurs to laser beams reflected from prisms 142, electronic process shutter 114 is closed to terminate the exposure of the surfaces of disk 49 to the laser beam. Thus, an annular space on disk 49 is textured by placing a number of laser-generated texture patterns along a spiral, with the distance between the patterns adjacent along the spiral being determined by the rate at which laser 108 is pulsed, and by the rate of rotation of spindle 86, while the distance between radially adjacent segments of the spiral is determined by the rates of rotation and translation of spindle 86.

After completion of the texturing process, the rotation of spindle 86 is stopped, or allowed to decelerate, as the spindle assembly 88 continues moving outwardly, opposite arrow 102, to stop in the position adjacent to grippers 78, at the inward-extending end of the arm 72. At this point, the arm 72 is held forward, in the direction opposite arrow 50, so that the disk 49 can pass behind the grippers 78, which are held open. When this outward motion of spindle assembly 88 is complete, and when the rotational motion of spindle 86 is fully stopped, the arm 72 is moved rearward, and the grippers are closed to engage the disk 49. Next, the shaft 90 (shown in FIG. 8) is moved forward so that the clamping blocks 95 (also shown in FIG. 8) are retracted inward, releasing the disk 49 from spindle 86. Then, the arm 72 is moved forward, opposite the direction of arrow 50, and arm 72 is rotated 180 degrees about the axis of its drive shaft 73, opposite the direction of arrow 74, and the arm 72 is moved rearward, in the direction of arrow 50, moving the disk 49, which has most recently been textured, into position above the disk lifter 59. Next, lifter 59 moves upward, accepting the textured disk in its groove 84. The grippers on arm 72 holding the textured disk are opened, and the lifter 59 then descends, placing the textured disk 49 in a pocket 51 within the cassette 58.

The preceding discussion has described the movement of a single disk 49 from the cassette 58, in right disk-handling station 38, through the texturing process in laser-texturing station 40, and back into the cassette 58. In a preferred version of the present invention, two disks are simultaneously moved in opposite directions between the cassette 58 and the spindle 86, which carries each disk through the texturing process. This type of disk movement will now be described, with particular references being made to FIGS. 5 and 7.

Referring to FIGS. 5 and 7, except during the movement of the first and last disks 49 held within an individual cassette 58, each rotational movement of arm 72 in or opposite the direction of arrow 74 preferably carries one disk 49 from the disk lifter 59 to spindle 86 within grippers 77, while another disk 49 is simultaneously carried within grippers 78 from the spindle 86 to disk lifter 59. Sequential rotational movements of arm 72, which are similar in their movement of disks, occur in opposite rotational directions to avoid the winding of air hoses to actuators 79 and of wires to grippers 77, 78, which would occur if such movements were to continue in one direction.

Furthermore, a preferred version of the present invention returns each textured disk 49 to the cassette pocket 51 from which it has been taken, leaving the pockets 51 which have been determined to be empty by proximity sensor 70a in an empty condition. These conditions are achieved in a preferred version of the present invention, by allowing the simultaneous movement of two disks 49 by the pick and place mechanism 71, and by using the indexing conveyor 57 to return cassette 58 to the position in which disk lifter 59 accesses the pocket from which a disk 49 was taken before replacing the disk 49 in the cassette 58.

As a disk 49, which is hereinafter called the "A" disk 49 for convenience, is being taken through the texturing process by spindle 86, a "B" disk 49, which is the next disk 49 in the direction opposite arrow 50 past the cassette pocket 51 from which the "A" disk 49 has been taken, is found by movement of the cassette 58 in the direction of arrow 50 past the proximity sensor 70a. At this point, the movement of cassette 58 is stopped, and disk lifter 59 moves the "B" disk 49 upward, into the position indicated by phantom line 82. When the process of texturing the "A" disk 49 is finished, spindle 86 moves the "A" disk 49 into the position indicated by phantom line 83. When both the "A" and "B" disks 49 have been positioned in this way, pick-and-place mechanism 71 moves to the rear, in the direction of arrow 50, and both sets of grippers 77, 78 are closed to grasp the "A" and "B" disks 49. The spindle is disengaged from the "A" disk 49, and the disk lifter 59 moves downward to disengage from the "B" disk 49. Next, the pick-and-place mechanism 71 moves forward, opposite the direction of arrow 50, and the arm rotational drive motor 75 drives arm 72 through a 180-degree angle in the direction of arrow 74. Now, the positions of the "A" and "B" disks 49 are reversed, with the "A" disk 49 being positioned for movement through the texturing process on spindle 86, and with the "B" disk 49 being positioned for return to cassette 58. Next, pick-and-place mechanism 71 moves to the rear, in the direction of arrow 50, placing the "B" disk 49 on spindle 86, and aligning the "A" disk 49 with disk lifter 59.

Thus, a first disk transfer point is established at the disk location shown by phantom line 82, and a second disk transfer point is established at the disk location shown by phantom line 83, both with pick-and-place mechanism 71 moved to the rear, in the direction of arrow 50. At the first disk transfer point, a disk 49 is transferred in either direction between pick-and-place mechanism 71 and disk lifter 59. At the second disk transfer point, a disk 49 is transferred in either direction between pick-and-place mechanism 71 and spindle 86.

In a preferred mode of operation, computing system 70 stores data indicating the pocket 51 within cassette 58 from which each disk is taken. This data is subsequently used to determine how the cassette 58 is moved opposite the direction of arrow 50 to return to the place from which the "A" disk 49 has been taken. When a cassette full of disks to be textured has been loaded into the disk-handling station 38, the cassette is moved one pocket position in the direction opposite that of arrow 50, from the position in which the pocket at which "B" disk 49 has been taken is directly above disk lifter 59, to the position in which the pocket at which "A" disk 49 has been taken is above disk lifter 59. If the cassette 58 was not full of disks 49 to be textured when it was loaded into disk-handling station 48, the cassette 58 may have to be moved farther than one pocket position opposite the direction of arrow 50. In any case, the cassette is moved so that the pocket from which the "A" disk 49 was taken is above disk lifter 59, using disk position data stored within computing system 70 and moving the cassette using indexing conveyor 57. This cassette movement can occur as the "A" disk is being moved, by pick-and-place mechanism 71, into place for reinsertion into the cassette 58, with the pick-and-place mechanism 71 moved forward, opposite the direction of arrow 50.

Next, disk lifter 59 moves upward, engaging "A" disk 49 within its groove 84, and the spindle 86 engages the "B" disk 49. The grippers holding the "A" disk are opened, and disk lifter 59 moves downward, restoring "A" disk 49 into the pocket 51 from which it was taken, and spindle 86 moves inward, in the direction of arrow 102, while rotationally accelerating the disk to the rotational velocity at which texturing will occur. In this way, preparations are made to texture the next disk 49, which is, at this time, the "B" disk.

The first disk 49 taken from each individual cassette 58 is moved alone from disk lifter 59 to spindle 86, without the simultaneous movement of another disk 49 in the opposite direction, since there is no other disk available for such movement. Similarly, the last disk 49 taken from each individual cassette 58 is moved alone from spindle 86 to disk lifter 59, since there is no other disk available for movement in the opposite direction. The determination that the last disk 49 to be textured has been removed from the cassette 58 is made when the last pocket 51 into which disks 49 can be placed is moved past disk lifter 59 without the detection of another disk 49 by proximity sensor 70a. Only a single cassette 58 at a time is moved onto indexing conveyor 57, with all of the disks 49 to be textured within the cassette 58 being removed from the cassette 58, sent through the texturing process, and returned to the cassette 58 before any of the disks 49 in the next cassette 58 are so processed.

Referring to FIG. 6 the transfer table 150 is mounted atop slider mechanism 149, including a slider 151, having a pair of cylinders 152, through which a pair of hollow shafts 153, 154 extend. The shafts 153, 154 are in turn mounted to extend between end blocks 155. The slider 151 is slidably mounted on the shafts 153, 154. The slider 151 is moved in either direction along shafts 153,154 by means of air pressure, between a first position in which transfer table conveyer 60 is aligned with indexing conveyer 57 and a second position in which transfer table conveyer is aligned with output conveyer 61. Each piston 157 includes seals separating the cylinder 152, within which it is attached, into an inward chamber 158 and an outward chamber 159, each of which is alternately filled with compressed air or exhausted to effect movement of the slider 151.

To move slider 151 inward, in the direction of arrow 102, compressed air is directed to the inward chambers 158, from hose 160, through a hole 161 in shaft 153.

The movement of a cassette 58 following the return thereto of all disks 49, having been textured, will now be discussed, with specific references being made to FIGS. 5, and 6.

Thus, referring to FIGS. 5 and 6, when it is determined that the last disk 49 to be textured in a cassette 58 has been processed and returned to the cassette 58, both intermediate conveyor 57 and transfer table conveyor 60 are turned on to move the cassette 58 rearward, in the direction of arrow 50, until the cassette 58 is completely on transfer table conveyor 60, as indicated by the output of transfer table cassette sensor 69. Upon the indication of sensor 69, movement of conveyors 57 and 60 is stopped, and a slider mechanism 149 is operated to drive the transfer table 150, which includes transfer table conveyor 60, in an outward direction, opposite the direction of arrow 102 along hollow shafts 153,154. After this motion is stopped with transfer table conveyor 60 in alignment with output conveyor 61, the conveyors 60, 61 are turned on to move cassette 58 to the front, opposite the direction of arrow 50. If other cassettes are not stored along the output conveyor 61, this movement is stopped when the cassette has been brought to the front of the conveyor 61, to the position in which cassette 166 is shown in FIG. 5, as indicated by a first output cassette sensor 168. At this point, the cassette 166, with processed disks 49, is ready for removal from the disk texturing tool 37.

Continuing to refer to FIG. 5, while this condition of readiness is preferably communicated to the system operator through a visible or audible indication, the removal of a cassette 166 with textured disks 49 is not generally required to permit continued operation of the disk texturing tool 37. Space is provided along output conveyor 61 for the storage of a number of cassettes 166 filled with textured disks 49. In a first version of this output system, all such cassettes 166 are stored along the surface of output conveyor 61. In a second version of this output system, the first cassette to reach the front of output conveyor 61 is stored on a raised platform The operation of the first version of this output system will now be described. In this version, if a cassette 166 is waiting for removal at the front of output conveyor 61 when the processing of disks 49 within another cassette 58 is completed, output conveyor 61 is turned on to move the cassette 166 rearward, in the direction of arrow 50. This movement is stopped when the presence of cassette 166 is detected by a second output cassette sensor 170. Then, with transfer table conveyor 60 in alignment with output conveyor 61, both transfer table conveyor 60 and output conveyor 61 are turned on to move cassettes 166 and 58 together to the front of conveyor 61, where this motion is stopped as first output cassette sensor 168 detects the presence of cassette 166. If necessary, this process is repeated several times, until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches first output cassette sensor 168.

The operation of the second version of this output system will now be described. This version requires an additional cassette lifting platform 172, which is similar to the platform 54 used with input conveyor 47, and a third output cassette sensor 174. With this version, the first cassette 166 to reach the end of output conveyor 61 is raised off the conveyor with lifting platform 172, to remain in a raised position until it is removed by the tool operator. With a cassette 166 in the raised position, output conveyor 61 is operated in both directions while not affecting the position of the cassette 166. Thus, when a second cassette, such as cassette 58, is loaded onto output conveyor 61, this conveyor 61 is turned on to drive the cassette forward, in the direction opposite arrow 50. This motion is stopped when the cassette is detected by third output cassette sensor 174. When the disks in a third cassette are completed, output conveyor 61 is turned on to drive the second cassette rearward. This motion is stopped when the second cassette is detected by second output cassette sensor 170. Then both transfer table conveyor 60 and output conveyor 61 are turned on to move the second and third cassettes forward, opposite the direction of arrow 50, until the second cassette is detected by third output cassette sensor 174.

Again, this process is repeated until output conveyor 61 is filled with a queue of cassettes holding disks 49 which have completed the texturing process. In each case, the rearward motion of output conveyor 61, in the direction of arrow 50, is stopped when the rearmost cassette in the queue reaches second output cassette sensor 170, and the subsequent forward motion of output conveyor 61 is stopped when the forwardmost cassette in the queue reaches third output cassette sensor 174. These movements occur as the first cassette 166 remains on raised platform 172.

At any point, if the cassette 166 on platform 172 is removed by the tool operator with one or more cassettes remaining on output conveyor 61, the conveyor 61 is turned on to drive the next cassette to the end of the conveyor 61, as detected by first output cassette sensor 168. The platform 172 is again raised to lift this cassette off output conveyor 61.

The methods described above for handling cassettes provide the particular advantage of not operating any conveyor system 47, 57, 60, 61 in sliding contact with a cassette. The generation of wear particles from relative motion between conveyor systems and cassettes is therefore avoided. Such wear particles could otherwise contaminate the manufacturing process of which this texturing is a part. Furthermore, the useful life of conveyor belts and cassettes is increased, with cassettes and conveyer belts being likely to last as long as various other moving parts of the disk texturing tool 37.

The configuration of output conveyor 61 extending alongside input conveyor 47 provides the advantage of bringing output cassettes, holding disks which have gone through the texturing process, back to a place adjacent to the place where input cassettes are loaded. This facilitates servicing the tool 37 by personnel who must both load and unload cassettes. Furthermore, additional space for queuing cassettes along the conveyors is gained without having to increase the length of the tool 37 along the conveyors.

The preceding discussion of the movement of cassettes and disks has focussed on such movement within right disk-handling station 38 of the laser-texturing tool 37. Thus, the various movements of disks and cassettes described above are used alone if the left disk-handling station 39 is not available. For example, the left disk-handling station may not be available due to a technical problem, or simply because cassettes have not been loaded into it. Furthermore, an embodiment of the present invention has only a single disk-handling tool, which is operated as described in detail above. Nevertheless, in the preferred method of operation of the preferred embodiment of the present invention, which will now be described with particular reference being made to FIG. 5, both right disk-handling station 38 and left disk-handling station 39 are used in an alternating fashion to present disks to be textured within laser-texturing station 40.

Thus, referring to FIG. 5, in a preferred version of the present invention, the operation of left disk-handling station 39 is generally the same as operation of right disk-handling station 38, with various elements of the apparatus within the left disk-handling station 39 being mirror image configurations of corresponding elements within the right disk-handling station 38. The preceding discussion of operations within right disk-handling station 38 is equally applicable to operations within left disk-handling station 39, with rearward motions, in the direction of arrow 50, remaining the same, and with inward motions, in the direction of arrow 102 continuing to be directed toward the center of the laser texturing tool 37, in the direction of arrow 166, within left disk-handling station 39. Similarly, forward motions, opposite the direction of arrow 50 are in the same direction in both left and right disk-handling stations 38, 39, while outward motions in left disk-handling station 39 are opposite the direction of arrow 166.

Within disk-texturing station 40, right shuttling mirror 138 is mounted on a mirror slide 176, together with a left shuttling mirror 178. Mirror slide 176 is operated pneumatically, sliding on a pair of shafts 180. With mirror slide 176 in its leftward position, moved in the direction of arrow 181 as shown in FIG. 5, the laser beams passing through power control optics block 136, having been derived from the output of infrared laser 108, are directed to disk 49, clamped on spindle 86 of right disk-handling station 39, as previously described. Mirror slide 176 is alternately moved into a rightward position, so that the laser beams passing through power control optics block 136 reflect off left shuttling mirror 178, being directed to a disk 182 held by spindle 184 of left disk-handling station 39. In this way, the laser beams employed in the disk texturing process are directed to either disks within the right disk-handling station 38 or left disk-handling station 39 simply by moving mirror slider 176.

While the above discussion describes the use of a sliding mechanism having two mirrors to direct the laser beams between the two disk-handling stations 38, 39, a single pivoting mirror could alternately be used for this purpose.

The operation of right disk-handling station 38, which has been described in some detail above, may be considered to consist basically of disk-movement cycles alternating with texturing cycles, wherein each disk movement cycle consists of the movement of one or two disks by pick-and-place mechanism 71, and wherein each texturing cycle consists of the movement of a single disk on the spindle 86. Whenever sufficient disks are available for texturing to allow the disk texturing tool 37 to operate at full capacity, each disk-movement cycle of right disk-handling station 38 occurs simultaneously with a texturing cycle of left disk-handling station 39, and each disk-movement cycle of left disk-handling station 39 occurs simultaneously with a texturing cycle of right disk-handling station 38. In this way, the use of the texturing process available through operation of infrared laser 108 is maximized, along with the overall process speed of the laser texturing tool 37. However, when disks to be textured are not available from one of the disk-handling stations 38, 39, the other disk handling station can continue to run at its full speed.

Referring to FIGS. 5–7, a preferred version of the present invention includes a bar code scanner 186 for reading bar code labels (not shown) placed on a side of a cassette 48, which is put on platform 54. To use this feature, the computing unit 70 executes a program relating bar codes read by scanner 186. Data gathered by reading bar code labels may be stored and used by an inventory control system to keep track of work in process.

The present invention provides advantages of optimized productivity and flexibility. In a preferred mode of operation, both disk-handling stations 38, 39 are simultaneously used as described above, maximizing the rate of production for the laser texturing tool 37. The use of laser 108 is optimized, with various disk-handling processes in each disk-handling station 38, 39 occurring while a disk 49,172 in the other disk-handling station is being exposed to the laser. The use of separate disk-handling stations also provides flexibility; if either of the disk-handling stations 38, 39 is disabled, production can continue at a reduced rate using the other disk-handling station. A single disk-handling station 38, 39 can also be used, if desired, when untextured disks sufficient for the use of both stations are not available for the process.

Methods for controlling the pulsed laser 108 of the disk texturing device described above will now be described, with particular references being made to FIGS. 8–14.

Figure 8:
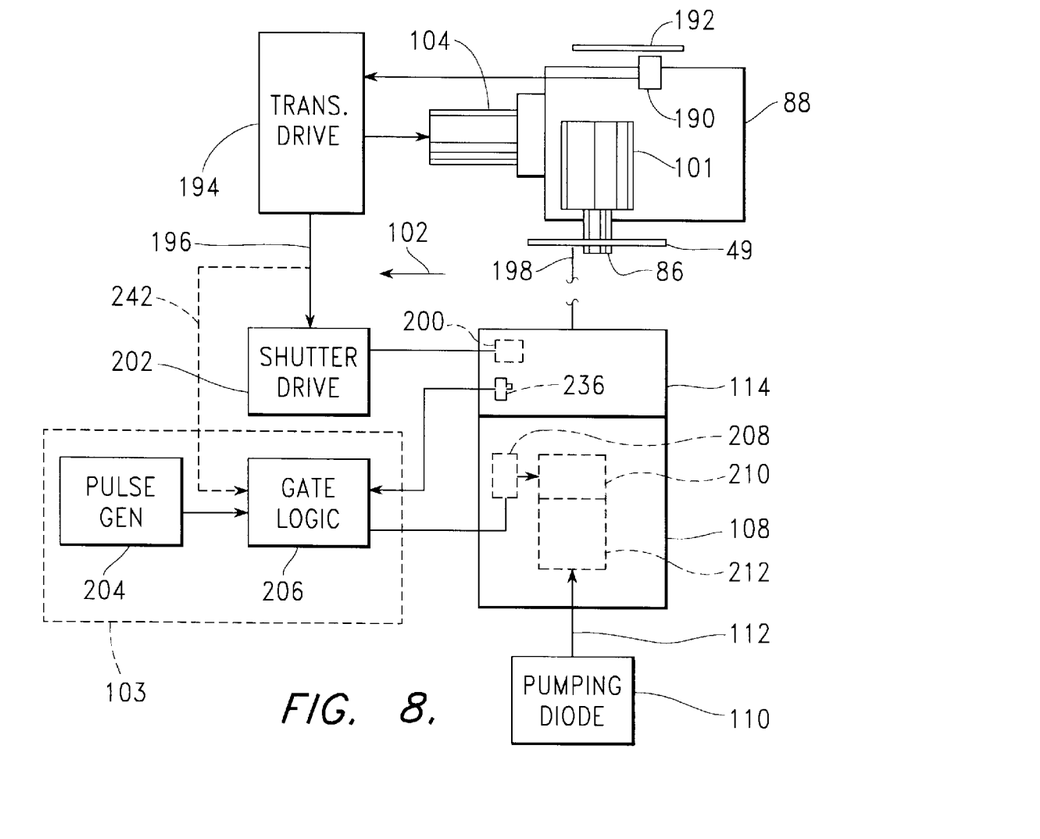
FIG. 8 is a schematic view of apparatus associated with controlling the pulsed laser of FIG. 5.

FIG. 8 is a schematic view of apparatus associated with controlling the pulsed laser 108. As previously described, the disk 49 to be textured is held in a spindle 86 while it is rotated by a spindle drive motor 101 of a spindle assembly 88. The spindle translation motor 104 moves the entire spindle assembly 88, first in the direction indicated by arrow 102, and then in the direction opposite that of arrow 102. The texturing process occurs during this return motion, opposite the direction of arrow 102. The motion of spindle assembly 88 is tracked by an encoder 190 moving adjacent to an encoder scale 192. Operation of the spindle translation motor 104 is controlled by a translation drive circuit 194, which responds to inputs from the encoder 190, moving the spincle assembly in the required reciprocating motion. The translation drive circuit also generates an output signal on line 196 to control the timing of the texturing process; this timing signal is present whenever encoder 190 indicates that the aiming position of a laser beam 198 is within the annular region (such as region 18 in FIG. 1) of the disk 49 to be textured.

In accordance with a first embodiment of the present invention, the pulsed laser 108 is maintained in an operational state during the handling and processing of disks, with the process of texturing an individual disk beginning as the process shutter 114 is opened and ending as this shutter 114 is closed. The process shutter 114 is an electrically driven device, being opened, for example, when an internal magnet coil 200 is energized and closed when power is dropped from this coil 200. Thus, shutter drive circuit 202 drives magnet 200 whenever an input is present on signal line 196, indicating that the disk 49 is being translated opposite the direction of arrow 102 so that the annular region requiring texturing will be exposed to the laser beam 198 when the shutter 114 is opened.

Figure 10:
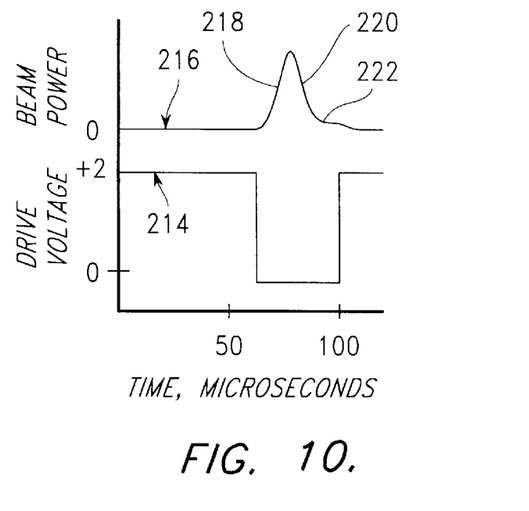
FIG. 10 is a graphical view similar to FIG. 9, except that the radio frequency signal is driven for 60 milliseconds between pulses.

For example, as previously mentioned, the laser 108 is energized by diode pumping from a laser diode 110 through a fiber-optic cable 112, and is pulsed by a Q-switch control 103. In FIG. 10, this Q-switch control 103 is shown to include a pulse generator 204 to generate a square wave corresponding to the desired train of laser beam pulses, and gate logic 206 to determine when laser beam pulses occur. The laser 108 includes an oscillator 208 driving an acousto-optic Q-switch 210, within a laser cavity 212 within the laser 108, with a radio-frequency signal. When the Q-switch 210 is acoustically activated by this radio-frequency signal, it spoils the Q-factor of the laser cavity 212, stopping the emission of a laser beam. When the radio-frequency energy is turned off for a relatively short time, the laser is permitted to emit a laser beam pulse. In a typical production mode of the laser texturing fixture 37 (shown in FIG. 4), the frequency of pulse generator 204 is set at 10KHz, producing a pulse every 100 microseconds, while the oscillator 208 produces a radio-frequency wave at 80 Mhz.

The level of power which may be delivered from pumping diode 110 depends on the type of laser 108 employed within the system. For example, one type of laser 108 uses up to 2 watts of power from pumping diode 110, while another type of laser 108 uses as much as 20 watts. Furthermore, the use of a different laser configuration suggests the use of different frequencies, with the pulse generator 204 operating, for example, at 70 KHz.

Referring additionally to FIG. 3, in the context of the disk texturing process described herein, it is particularly desirable to be able to vary the shape of each laser beam pulse within a train of such pulses. For example, a longer pulse width (or greater pulse duration) tends to produce a higher rim 34 in the textured area, together with a lower central area 30. However, if the conventional means of varying the repetition rate (i.e. the frequency of the square wave pulses from pulse generator 204) is used, any attempt to change the wave shape also results in a change in the time between pulses, and, therefore, in a variation in the distance between textured spots on the disk. An attempt to correct this may result in further changes to spot size and in an unsatisfactory variation in the time required to complete the process of texturing a single disk. To overcome such difficulties, pulse generator 204 is configured to have a variable duty cycle.

Figure 9:
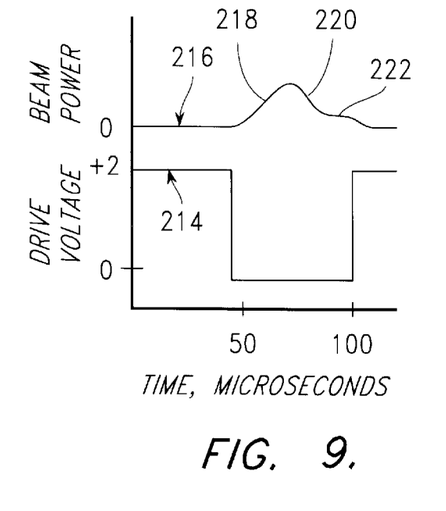
FIG. 9 is a graphical view of a pulse emitted by the pulsed laser of FIG. 8 at a repitation rate of one pulse per 100 microseconds with a radio frequency signal being driven into a Q-switch in the laser for 45 microseconds between pulses.
Figure 11:
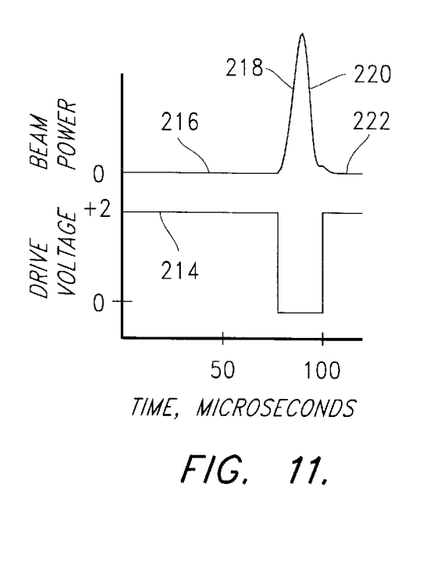
FIG. 11 is a graphical view similar to FIG. 9, except that the radio frequency signal is driven for 75 milliseconds between pulses.
Figure 13:
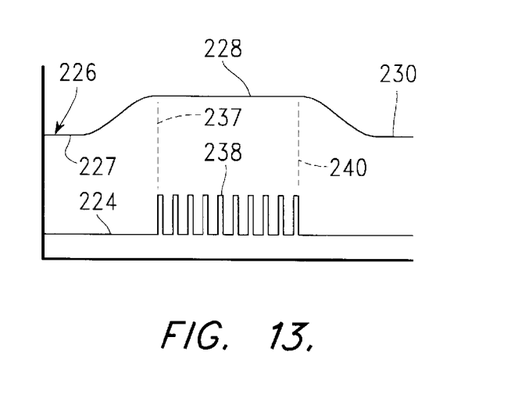
FIG. 13 is a graphical view similar to FIG. 12, except that operation is according to a second embodiment of the present invention, with pulses being generated only when the shutter is fully open.

FIGS. 9-11 are graphical views showing the effects of variations in the duty cycle on the shape of the laser pulse emitted. In each of these FIGS., a lower curve 214 represents a drive voltage applied from the pulse generator 204, through gate logic 206, as an input to function generator 208. In the example of these FIGS., when two volts is applied in this way, the function generator 208 drives Q-switch 210 with radio-frequency energy, preventing the emission of a laser beam pulse, as shown in the upper laser beam power curve 216. Each FIG. 9-11 shows a 100-microsecond single pulse in a train of pulses generated at 10 KHz. In FIG. 9, the duty cycle (the ratio of time Q-switch 210 is driven with a radio-frequency signal divided by the total time of a cycle) is 45 percent. In FIG. 10, the duty cycle is 60 percent. In FIG. 13, the duty cycle is 75 percent.

In each FIGS. 9-11, when the drive voltage is dropped, the laser output power rises rapidly along an initial curve portion 218 to a maximum level, and then falls along a second curve portion 220 to a much lower level at third curve portion 222, which continues until the drive voltage is restored. During the portion of each cycle preceding the laser pulse, energy is accumulated, with more energy being accumulated as a longer time is allowed for this purpose. Both the steepness of the subsequent rise in laser output power and the level to which this power rises are increased with the increased stored energy of pulses having higher duty cycles.

Thus, through the use of a pulse generator 204 having a variable duty cycle, an ability is gained to change the height and width of individual laser beam pulses, without changing the repitition rate of such pulses. This feature is especially useful in a texturing system used to texture disks formed with different materials or to texture disks according to multiple requirements.

Figure 12:
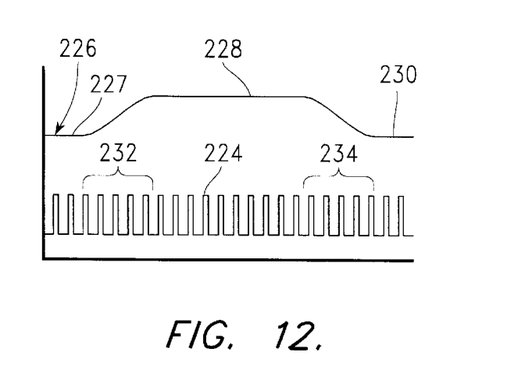
FIG. 12 is a graphical view of the output of pulses from the laser of FIG. 8, together with the motion of the shutter of FIG. 8, according to a first embodiment of the present invention, with pulses being continuously generated as the shutter is opened and closed to control the texturing process.
Figure 14:
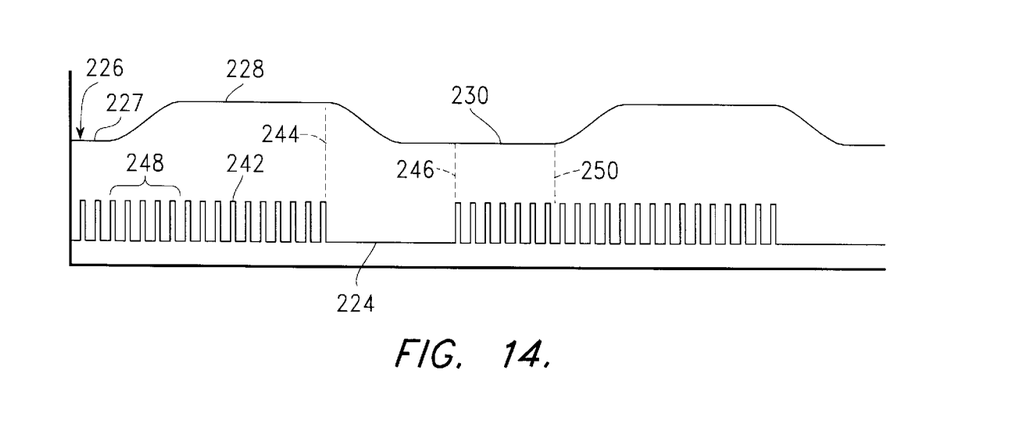
FIG. 14 is a graphical view similar to FIG. 12, except that operation is according to a fourth embodiment of the present invention, with pulses being stopped as the shutter is closed, but started again before the shutter is reopened.

FIGS. 12-14 are graphical views showing various patterns of laser switching, together with an associated movement within the process shutter 114 as it is opened to allow the passage of a laser beam and as it is subsequently closed. In each FIG. 12-14, the lower curve 224 represents the pulsed laser beam output, while the upper curve 226 represents the movement of the process shutter mechanism between a fully closed position at curve portion 227 to a fully open position at curve portion 228, and closure again to curve portion 230.

FIG. 12 represents system operation according to a first embodiment of the present invention. During the processes associated with texturing and disk handling, laser pulses occur continually. Referring to FIGS. 8 and 12, for this type of operation, a connection is not required from the limit switch 196 or the shutter 114 and gate logic 206. Only the shutter 114 is closed at the end of texturing, as power to magnet 200 is dropped by shutter drive circuit 202 in response to an indication by limit switch 196. The shutter 114 is preferably of a type which, when closed, directs reflected laser power into a beam dump, preventing its reflection back into the laser.

While this method has advantages of simplicity and of laser stability, since the pulsed operation of the laser does not need to be varied during processing, it has the disadvantage of producing a number of textured spots of variable geometry at both the inner and outer diameters of the textured region. These variable spots result from partial exposure to laser beam pulses 232 occurring while the process shutter 114 is opening and to pulses 234 occurring while the shutter is closing.

FIG. 13 represents system operation according to a second embodiment of the present invention, in which laser beam pulses occur only when the process shutter 114 is fully open, or at least, nearly fully open. Referring to FIGS. 8 and 13, for this mode of operation, the process shutter 114 is equipped with a switch 236, which closes as the shutter completes its process of opening, and which opens as the shutter is closing. The output of this switch 236 is provided as an input to gate logic 206. When the shutter 114 is opened, the input from shutter switch 236, occurring at cycle time 237, is used to time the beginning of the period when laser beam pulses 238 are produced. At cycle time 240, shutter drive circuit 202 shuts off the current flowing through shutter magnet 200 and begins to provide a signal to gate logic 206 so that the Q-switch 210 stops the production of laser beam pulses 238.

In this second embodiment, the process shutter 114 is used only to provide a safety feature, preventing, for example the exposure of disk surfaces where texturing is not to occur to laser pulses if the laser is somehow turned on prematurely of if the laser fails to extinguish. Operator safety is ensured by a separate safety shutter 116, (which has been previously described in reference to FIG. 5), which closes when a door to the optics cabinet is opened or when certain failures occur.

Therefore, a third embodiment of the present invention, which is represented by the lower curve 224 of FIG. 13 without the upper curve 226, eliminates process shutter 114, as the output from transport drive circuit 190 is provided directly as an input to gate logic 206. This alternative connection is represented in FIG. 8 by dashed line 242. In this embodiment, the shutter 114, magnet 200, and switch 236 are eliminated.

However, both these second and third embodiments share a disadvantage of initial laser stability during the texturing process. When the gating signal is removed to allow the formation of laser beam pulses 237, due to the output of shutter switch 236 or due to a signal sent along line 242, one or more of the initial pulses may be significantly different from the others, since time is required to overcome initial transient effects.

FIG. 14 represents system operation according to a fourth embodiment of the present invention, in which the laser beam pulses 242 are turned off at a time 244, which is coincident with beginning to open the shutter 114 by dropping power to magnet 200. However, in the example of FIG. 16, laser pulses are turned on at cycle time 246, after a fixed time from cycle time 244 has expired. This fixed time, which may be measured with a conventional timing circuit, providing an input, along with switch 236, to gate logic circuit 206, is typically set to occur just after the shutter 114 fully closes. Thus, operation in this mode is achieved by the operation of gate logic 206 from line 242 with an appropriate timing circuit included in the gate logic 206; a shutter switch 236 is not required.

With this method, textured spots of varying size are produced at the inner diameter of the region being textured, resulting from exposure to laser beam pulses 248 during the opening of shutter 114. However, this effect does not occur at the outer diameter of the region being textured. In the application previously described in reference to FIG. 1 (i.e., in the production of a magnetic disk having a CSS region) the textured area adjacent the inner diameter of the textured region is considered to be unimportant, while the textured area adjacent the outside diameter of the textured region is considered to be particularly important. Thus, the variable-size spots at the inner diameter resulting from the process of the fourth embodiment are judged not to be significant. On the other hand, this process has the advantage of allowing ample time to expire after turning on the laser pulses at cycle time 246, before the shutter is opened at time 250 for the next texturing process. This time allows the pulsed operation of laser to stabilize, overcoming transient effects. Again, the shutter 114 is preferably of a type which, when closed, directs reflected laser power into a beam dump, preventing its reflection back into the laser.

If it is necessary to produce a disk having uniformly textured spots at the inner diameter of a textured region but not at the outer diameter thereof, the method of the fourth embodiment can be used with texturing occurring as the disk is translated in the direction of arrow 102.

Since the pulsed operation of laser 108 is caused by the intermittent actuation of Q-switch 210 by oscillator 208, these laser pulses may be stopped either by leaving the radio frequency signal to Q-switch 210 either off or on. Referring to FIGS. 10 and 12, the energy required for a single pulse, including an upward sloping portion 218 and a downward sloping portion 219, is accumulated as oscillating energy is driven into the laser cavity 212 from pumping diode 110. When the driving signal 214 is dropped below zero volts, the radio frequency signal to Q-switch 210 stops, and a single laser pulse is emitted. After completion of this pulse emission, power continues to be emitted at a much lower level, as indicated by beam power curve portion 222. As long as the radio frequency signal to Q-switch 210 is not reintroduced, the emission of power may continue with the continued input of power to the laser cavity 212 from pumping diode 110. Power at this level, which may not even include a coherent laser beam, typically does not cause texturing or otherwise effect the surface of the disk 49, so leaving the drive signal 214 on until the next pulse is needed constitutes a valid way of turning off the laser pulses. When the next pulse is needed, the radio frequency signal to Q-switch 210 is turned back on, in the example of FIG. 12 for 60 microseconds, and the termination of this signal is followed by a single pulse, which may be the first in a train of pulses.

Alternately, after the last pulse in a train of pulses, the radio frequency signal to Q-switch 210 may be continued, causing this switch 210 to prevent the emission of other pulses. With this method, when the first pulse in a subsequent train of pulses is desired, the radio frequency signal is turned off, so that a pulse immediately followes. This method has the potential disadvantage, when compared to the method in which the radio frequency signal is left off to prevent pulses, of producing a significantly higher-power first pulse in each pulse train, since the laser cavity 212 has been allowed to absorb additional energy from pumping diode 110 for a much longer time than the time between pulses in a pulse train.

While the above descriptions anticipate the use of a Q-switch to begin and end the production of laser beam pulses, it is understood that the pumping diode 110 can alternately be switched on and off for this purpose. However, a disadvantage of using the pumping diode in this way it that the laser output becomes unstable, with transient effects changing the initial pulses after the diode is turned on.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for texturing an annular region on a disk, wherein said apparatus comprises:
   a Q-switched laser producing a beam directed at said disk;
   a spindle drive rotating said disk;
   a translational drive causing relative movement between a target of said beam and said disk in a radial direction along said disk;
   an oscillator driving a Q-switch within said laser with a radio-frequency signal; and
   a pulse generator causing pulsed operation of said oscillator, wherein a time duration of each pulse within a train of pulses from said pulse generator may be varied without simultaneous variation of frequency of said pulses within said train thereof.

2. The apparatus of claim 1, comprising additionally:
   motion sensing means operating in response to said relative movement caused by said translational drive, wherein said motion sensing means provides a first signal indicating that said target of said laser is within said annular region with said relative motion occurring in a pre-determined direction;
   a shutter, through which said beam is directed at said disk, opening at a beginning of said first signal and closing at an end of said first signal; and
   a gate circuit switching between a closed mode preventing a flow of pulses from said pulse generator to said oscillator and an open mode allowing said flow of pulses, wherein said gate circuit switches to said closed mode when said shutter is closed.

3. The apparatus of claim 2;
   wherein said apparatus comprises additionally switching means operating in response to said shutter, providing a second signal indicating that said shutter is fully open; and
   wherein said gate circuit switches to said open mode in response to said second signal.

4. The apparatus of claim 2, wherein said gate circuit switches to said open mode when a predetermined time has elapsed after said shutter is closed and before said shutter is opened.

5. The apparatus of claim 2, wherein, during operation in said closed mode, said gate circuit provides an output signal causing said oscillator to drive said Q-switch with said radio-frequency signal.

6. The apparatus of claim 2, wherein, during operation in said closed mode, said gate circuit prevents said oscillator from being driven by a signal causing said oscillator to drive said Q-switch with said radio-frequency signal.

7. The apparatus of claim 1, comprising additionally:

motion sensing means operating in response to said relative movement caused by said translational drive, wherein said motion sensing means provides a first signal indicating that said target of said laser is within said annular region with said relative motion occurring in a pre-determined direction: and a gate circuit operating in an open mode allowing a flow of said pulses in a presence of said first signal and in said closed mode preventing said flow of said pulses in an absence of said first signal.

8. Apparatus for texturing an annular region on a disk, wherein said apparatus comprises:

a laser producing a beam of pulses directed at said disk;

a spindle drive rotating said disk;

a translational drive causing relative movement between said beam and said disk in a radial direction along said disk;

motion sensing means operating in response to said relative movement caused by said translational drive, wherein said motion sensing means provides a first signal indicating that said target of said laser is within said annular region with said relative motion occurring in a pre-determined direction;

a shutter, through which said beam of pulses is directed at said disk, operating in response to said motion sensing means, opening which said first signal indicates that said laser is directed at said disk within said annular region and closing when said first signal indicates that said laser is directed at said disk outside said annular region, and electronic gating means, switching between a closed mode preventing production of said beam of pulses by said laser, and an open mode allowing production of said beam of pulses by said laser, wherein said electronic gating means switches to said closed mode when said shutter is closed.

9. The apparatus of claim 8:

wherein said apparatus comprises additionally switching means operating in response to said shutter, providing a second signal indicating that said shutter is fully open; and wherein said electronic gating means switches to said open mode when said second signal indicates said shutter is fully open.

10. The apparatus of claim 8, wherein said electronic gating means switches to said open mode when a predetermined time has elapsed after said electronic gating means is switched to said closed mode, and before said shutter is opened.

11. The apparatus of claim 8:

wherein said apparatus additionally comprises a Q-switch within said laser, a pulse generator, and an oscillator applying a radio-frequency signal to said Q-switch in response to a driving signal from said pulse generator;

wherein said electronic gating means in said open mode allows said driving signal to drive said oscillator; and wherein said electronic gating means in said closed mode continuously drives said oscillator.

12. The apparatus of claim 8:

wherein said apparatus additionally comprises a Q-switch within said laser, a pulse generator, and an oscillator applying a radio-frequency signal to said Q-switch in response to a driving signal from said pulse generator;

wherein said electronic gating means in said open mode allows said driving signal to drive said oscillator; and wherein said electronic gating means in said closed mode continuously prevents said oscillator from being driven by said driving signal.

13. The apparatus of claim 8, wherein said electronic gating means comprises means to switch a pumping diode.

14. Apparatus for texturing an annular region on a disk, wherein said apparatus comprises:

a laser producing a beam of pulses directed at said disk;

a spindle drive rotating said disk;

a translational drive causing relative movement between said beam and said disk in a radial direction along said disk;

motion sensing means operating in response to said relative movement caused by said translational drive, wherein said motion sensing means provides a first signal indicating that said target of said laser is within said annular region with said relative motion occurring in a pre-determined direction; and electronic gating means, switching between a closed mode preventing production of said beam of pulses by said laser, and an open mode allowing production of said beam of pulses by said laser, wherein said electronic gating means switches to said open mode in response to presence of said first signal and to said closed mode in response to termination of said first signal.

15. The apparatus of claim 14:

wherein said apparatus additionally comprises a Q-switch within said laser, a pulse generator, and an oscillator applying a radio-frequency signal to said Q-switch in response to a driving signal from said pulse generator;

wherein said electronic gating means in said open mode allows said driving signal to drive said oscillator; and wherein said electronic gating means in said closed mode continuously drives said oscillator.

16. The apparatus of claim 14:

wherein said apparatus additionally comprises a Q-switch within said laser, a pulse generator, and an oscillator applying a radio-frequency signal to said Q-switch in response to a driving signal from said pulse generator;

wherein said electronic gating means in said open mode allows said driving signal to drive said oscillator; and wherein said electronic gating means in said closed mode continuously prevents said oscillator from being driven by said driving signal.

* * * * *